United States Patent Office 2,973,342
Patented Feb. 28, 1961

2,973,342
PROCESS FOR PREPARING LINEAR POLYUREAS
Yanosuke Inaba and Koji Kimoto, Fujisawa City, Japan, assignors to Toyo Koatsu Industries, Incorporated, Chuo-ku, Tokyo, Japan, a corporation of Japan
No Drawing. Filed Oct. 6, 1958, Ser. No. 765,308
Claims priority, application Japan Oct. 9, 1957
20 Claims. (Cl. 260—77.5)

This invention relates to a process for producing polyureas by reacting urea, or urea derivatives, with alkylenediamines under heating.

It has been known from the British Patent No. 530,267 that polyureas are formed by reacting urea, or urea derivatives, with alkylenediamines under heating, whereby urea or urea derivatives are reacted under heating in the absence of a solvent, or in the presence of a solvent of the phenolic type. In this process, it is difficult to obtain pure linear polyureas, because of the formation of biuret, or biuret-like impurities, which are formed as by-products, as stated in the above-mentioned British patent.

It is an object of the present invention to avoid this difficulty in the formation of polyureas in the above-mentioned process.

It has now been found in experimental investigations that in the reaction of urea or urea derivatives with alkylenediamines under heating, urea or urea radical is dissociated to produce isocyanate radical and that the latter polymerizes by addition with amino radical, so as to produce polyureas. It has been further found that said polymerization by addition of the isocyanate radical with amino radical occurs during heating at relatively low temperatures when the reaction has begun and when the free amino radical is plentiful, and that it is terminated after a short period of time, so that the formation of linear polyureas takes place mainly in the initial period of reaction.

It has been also found that above temperatures of about 130° C. the amount of the free amino radical is so decreased that the desired formation of linear polyureas does not occur, and that at said temperatures biuret and biuret-like products are formed and by-reactions occur, and render the obtaining of pure linear polyureas difficult.

As a result of the above-mentioned investigations it has now been found that in order to obtain pure linear polyureas, the isocyanate radical must be mainly produced by dissociation of urea or urea radical by heating to relatively low temperatures up to about 130° C. in order to bring about addition polymerization of said isocyanate radical with the amino radical, and subsequently the condensation reaction due to the amino exchange must be substantially carried out at temperatures higher than about 130° C.

In accordance with the above, in carrying out the process of this invention omega-amino-alkylene urea is initially produced by heating at temperatures approximately below 130° C., and until the temperature becomes higher than about 130° C., the reaction must be conducted in such manner that no free urea remains in the reaction mixture.

In order to attain the formation of omega-amino-alkylene urea mainly at temperatures which are lower than about 130° C., according to the present invention the dissociation of urea must be carried out at relatively low temperatures.

It has been found that the temperatures at which urea is dissociated in various solvents are as follows:

| Solvent: | Dissociation temperature, ° C. |
|---|---|
| Ethanol | 82 |
| Water | 80–85 |
| Glycerol | 100 |
| Acetic acid | 100 |

In the absence of solvents urea is dissociated at 132° C. and the above data show that the lowest dissociation temperature is obtained in water.

It has been found that upon dissolving and heating urea and alkylenediamines in water, their reaction proceeds smoothly at temperatures below 130° C., whereby only about 1% of unreacted urea can be found. It is thereby possible not only to produce primarily omega-amino-alkylene urea at temperatures below 130° C., but also to prevent the presence of even very small amounts of free urea, at temperatures above 130° C.

Accordingly, the present invention consists in obtaining primarily omega-amino-alkylene urea or its derivatives by dissolving urea or urea derivatives and an alkylenediamine in water and heating at temperatures below 130° C. and in producing pure linear polyurea by condensation due to amine exchange reaction caused by heating to temperatures above 130° C.

The linear polyureas according to the present invention can be spun to fibres by conventional spinning procedures and the fibres thus obtained are distinguished by high tenacity, high pliability, and high Young's modulus and present valuable products.

It is an advantage of this ivention that omega-amino-alkylene urea is primarily formed at low temperatures due to its low melting point and that condensation is possible even at relatively low temperatures.

It has been further found that in using alkylenediamine slightly in excess over the equivalent ratio to urea, the molecular type can be easily changed to omega-omega'-diamine-dialkylene-urea which is capable of easily taking part in the amino exchange reaction at high temperatures, whereby condensation can be carried out easily.

Furthermore, it has been also found that in carrying out this invention the formation of alkylene-bisurea is restrained almost to zero. This is apparently due to the fact that at temperatures up to about 130° C., the reaction is conducted in such manner that substantially no free urea is found, as stated above. At temperatures above 130° C., free urea is likely to form alkylene-bisurea which has a high melting point and the tendency of causing the presence of impurities in the linear polyureas, due to the formation of biuret, branching, or bridge formation. It is a considerable advantage of the present invention that in carrying out the same no such impurities are formed.

For the sake of comparison, urea and alkylenediamine were reacted by heating in the absence of solvents at a temperature of about 120° C., at which both reactants were found to be dissolved in each other. Thereby it was found that although the reaction can be conducted up to a point where only about 1.5% of unreacted urea is found, the formation of alkylene-bisurea attained about 40–50%, so that pure linear polyureas could not be produced.

In further tests, instead of water other solvents were used under otherwise equal conditions. According to these tests the favorable results occurring in the use of water as solvent, could not be obtained.

In the formation of polyureas according to present invention it has been observed that due to the so-called urea-dearrangement, the polyureas are dissociated with the formation of isocyanate radical, whereby depolymerization corresponding to the following scheme occurs:

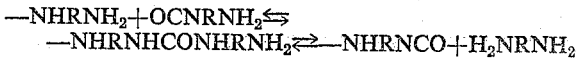

It is, therefore, important in carrying out the invention that the terminal union be converted to that other than urea, so that such depolymerization can be prevented. In order to attain this, alkylmonoamide or N acyl alkylenediamine can be used in order to cause occurrence of the following reaction:

$$-RNH_2 + H_2NCOR_1 \rightarrow -RNHCOR_1$$
$$+NH_3 - RNHCONH_2 + H_2NRNHCOR_2 \rightarrow$$
$$-RNHCONHRNHCOR_2 + NH_3$$

In the above schemes, $R_1$ and $R_2$ indicate alkyl radicals having at least three carbon atoms and R indicates alkylene radicals having six or more carbon atoms are preferred.

Serial No. 765,309, filed of even date herewith, states that omega-aminoalkylene urea can be obtained in pure condition by conventional manner from nitrourea. Serial No. 765,309 also discloses the preparation of linear polyureas starting with omega-aminoalkylene urea.

As shown in the equations given at the end of the specification, ammonia is evolved during the course of the formation of the spinnable polyurea.

Example 1

158 parts of nonamethylenediamine, 132 parts of methylenebisurea and 8 parts of N-palmitoyl-nonamethylenediamine (corresponding to a molecular ratio of 104:100:2) are dissolved in 150 parts of water and slightly heated to complete the dissolution. The resulting solution is heated to boiling under reflux at 95° C. for 40 hours, whereby the reaction proceeds with the evolution of ammonia. The amount of the evolved ammonia indicates that this evolution corresponds to about half of the theoretical amount. The temperature is then increased to about 120° C., whereby water is distilled off and subsequently to about 200° C., at which the reaction system solidifies. However, if the temperature is further increased to about 250° C., the reaction system melts again. After melting the reaction is continued under reduced pressure until a vacuum of 1-2 mm. Hg is attained, which requires about 3 hours. Thereby an end product having a melt viscosity of 2,000–2,500 poises is obtained.

This final product can be spun to fibres yielding white threads capable of 3.5 fold elongation.

If the threads are drawn out to 3.5 times their length under heating to 120° C.–140° C., they are formed into fibres having strength of 4.5–5 g./d. and Young's modulus of about 450 kg./mm.² in the final product.

Example 2

175 parts of nonamethylenediamine, 60 parts of urea and 8 parts of N-palmitoyl-nonamethylenediamine (corresponding to a molecular ratio of 104:100:2) are dissolved in 70 parts of water and dissolution is completed by heating to 70° C. The resulting solution is heated to boiling under reflux at 98° C. for 40 hours. During this period ammonia is produced in the reaction and the amount of unreacted urea in the reaction mass is reduced to about 1.2%. The reaction product has an average molecular weight of about 210 (calculated from the terminal amino radical in the reaction system) and the yield of omega-aminononamethyleneurea is about 95%. On the other hand, the formation of omega-omega'-diaminodinonamethylene-urea, or nonamethylenebisurea or other highly condensed product is limited up to about 3%.

The resulting reaction product is heated to about 120°–130° C., whereby about 95% of water is distilled off. The reaction is then further continued for 3 hours under reduced pressure of 1-2 mm. Hg, whereby a final product having an intrinsic viscosity of 0.78 in meta-cresol and a melt viscosity of 2000–2200 poises at 250° C. is obtained.

The final product can be spun into fibre of 400% elongation. If the fibre is elongated to about 4 times at ordinary room temperature, or under heating, polyurea fibre having strength of about 5–5.5 g./d. and Young's modulus of 400–600 kg./mm.² in the final product, and being capable of setting by heating at 110°–120° C., is obtained.

Example 3

200 parts of octamethylenediamine carbonate, 60 parts of urea and 5 parts of palmitic acid amide (corresponding to a molecular ratio of 104:100:2) are dissolved in 150 parts of water and the reaction is effected in an autoclave at about 115° C. under stirring for about 15 hours, whereby the pressure reaches 4–5 atmospheres. The reaction product contains 1.8% of unreacted urea and has an average molecular weight of 209, which indicates that omega-aminooctamethylene-urea was almost completely formed. The intermediate compound may be separated by crystallization from the reaction mass which results from the first step, prior to heating the separated intermediate compound in the second step.

The hot reaction product is filtered to remove precipitates. The filtrate which contains almost all of the omega-aminooctamethylene-urea produced, is heated at 120°–130° C. and the major portion of water is distilled off by heating up to 210° C., at which the reaction mass solidifies. After solidification the temperature is raised up to 240° C., whereby the reaction mass melts again, and the molten product is reacted for 3 additional hours under reduced pressure of 1–2 mm. Hg, whereby a final product having an intrinsic viscosity of 0.80 in meta-cresol and a melt viscosity of 1900–2100 poises at 250° C. is obtained.

This final product can be spun to fibres, which, after 4 times elongation of their length at ordinary temperature, yield a polyurea fibre having a strength of 5.0 g./d.; breaking elongation of 18% and a softening point of 200°–205° C. The final fibre has a specific gravity of 1.06, average moisture regain of 1.6% and can be set at relatively low temperatures. This final fibre has been found to be superior to nylon with respect to pliability and residual pliability, the superiority being 2–3 fold in comparison with nylon.

The parts stated herein are by weight if not otherwise stated.

As examples of further urea derivatives which can be used according to the present invention the following are mentioned: methylenebisurea, ethylenebisurea. These derivatives, or their mixtures with each other, or with urea, can be used in a manner substantially similar to that described in the above examples.

Further examples of alkylene diamines which can be used as reactants in carrying out this invention are: hexamethylenediamine, heptamethylenediamine, decamethylenediamine, undecamethylenediamine and dodecamethylenediamine.

Alkylenediamines may be employed in 1–1.5 mols to 1 mol urea or urea derivatives, preferably in 1–1.04 mols.

Stabilizers may be employed in 0.005–0.05 mol to 1 mol urea or urea derivatives, preferably in 0.01–0.025 mol.

Reaction between urea and nonamethylenediamine is believed as follows:

| Reaction | Description |
|---|---|
| $H_2NCONH_2 \rightarrow HNCO + NH_3\uparrow$ | Dissociation of urea. |
| $HNCO + H_2N(CH_2)_9NH_2 \rightarrow H_2NCONH(CH_2)_9NH_2$ | Additive reaction of diamine and isocyanic acid (formation of ω-amino-nonamethylene urea). |
| $NH_2(CH_2)_9NHCONH_2 \rightarrow NH_2(CH_2)_9NCO + NH_3\uparrow$ | Dissociation of ω-amino-nonamethyl-1 ene urea (formation of ω-aminononamethylene isocyanate). |
| $mNH_2(CH_2)_9NCO + NH_2(CH_2)_9NH_2 \rightarrow H_2N[(CH_2)_9NHCONH]_m(CH_2)_9NH_2$ | Additive reaction of ω-aminononamethylene isocyanate (formation of half-polymer). |
| $2H_2N[(CH_2)_9NHCONH]_m(CH_2)_9NH_2 \rightarrow H_2N[(CH_2)_9NHCONH]_{2m}(CH_2)_9NH_2 + H_2N(CH_2)_9NH_2$ | Diamine exchange reaction of half-polymer (formation of super polymer). |

The above examples describe some specific embodiments of and best modes for carrying out the invention, to which the invention is not limited.

What is claimed is:

1. A process for producing improved linear polyureas suitable for being spun into fibers, comprising reacting urea and alkylene diamine having from 6 to 12 carbon atoms in the alkylene moiety in aqueous solution at a temperature below about 130° C. to form omega-aminoalkylene urea which is substantially free of undesirable amounts of unreacted urea and diurea by-products, and thereafter raising the temperature of said omega-aminoalkylene urea above about 130° C. to form a spinnable, fiber-forming polyurea.

2. The process as claimed in claim 1 wherein the alkylene diamine is nonamethylenediamine.

3. The process as claimed in claim 1 wherein the alkylene diamine is octamethylenediamine.

4. The process for producing substantially linear polyureas capable of being spun into fibers, comprising reacting a urea compound selected from the class consisting of urea, methylene bisurea and ethylene bisurea and an alkylene diamine having from 6 to 12 carbon atoms in aqueous solution at a temperature below about 130° C. to form an intermediate reaction product which is substantially free of undesirable amounts of unreacted urea compound and diurea by-products, and thereafter raising the temperature of said intermediate compound above about 130° C. to form a spinnable, fiber-forming polyurea.

5. A process as claimed in claim 4 wherein the urea compound is methylene bisurea and the alkylene diamine is nonamethylenediamine.

6. The process claimed is claim 4 in which said intermediate reaction product is heated at a temperature of about 130° C. to about 270° C.

7. The process claimed in claim 4 wherein the molar ratio of alkylene diamine to urea compound is in the range of about 1.04 to 1 and 1 to 1.

8. The process claimed in claim 4 wherein the spinnable, fiber-forming polyurea is stabilized against depolymerization.

9. The process as claimed in claim 4 wherein the spinnable, fiber-forming polyurea is formed in the presence of a de-polymerization stabilizer selected from the class consisting of alkyl monoamide having at least 3 carbon atoms and N-acyl alkylene diamines having at least 6 carbon atoms in the diamine moiety and at least 3 carbon atoms in the acyl moiety.

10. The process of producing substantially linear polyureas capable of being spun into fibers, comprising heating an omega-aminoalkylene urea having from 6 to 12 carbon atoms in the alkylene moiety to a poly-condensation temperature which brings about the evolution of ammonia, and continuing such heating to form a spinnable, fiber-forming polyurea.

11. The process claimed in claim 10 in which said temperature is in the range of approximately 100° C. to approximately 265° C.

12. The process claimed in claim 10 wherein said omega-aminoalkylene urea is heated in the presence of a lesser amount of alkylene diamine having from 6 to 12 carbon atoms.

13. The process claimed in claim 10 wherein said polyurea is formed in the presence of a de-polymerization stabilizer.

14. The process claimed in claim 13 wherein said depolymerization stabilizer is selected from the class consisting of alkyl monoamides having from 3 to 18 carbon atoms and N-acyl alkylene diamines having from 3 to 18 carbon atoms.

15. The process as claimed in claim 10 wherein said omega-aminoalkylene urea is dissolved in a solvent during at least a part of said heating.

16. The process claimed in claim 15 wherein said solvent is selected from the class consisting of water, phenol and meta-cresol.

17. The process as claimed in claim 10 wherein said omega-aminoalkylene urea is omega-amino nonamethylene urea.

18. The process claimed in claim 10 wherein said omega-amino alkylene urea is omega-amino octamethylene urea.

19. The process as claimed in claim 10 wherein said omega-aminoalkylene urea is omega-amino heptamethylene urea.

20. The process claimed in claim 10 wherein said omega-aminoalkylene urea is omega-amino decamethylene urea.

References Cited in the file of this patent

UNITED STATES PATENTS

| | | |
|---|---|---|
| 2,174,527 | Peterson | Oct. 3, 1939 |
| 2,181,663 | Martin | Nov. 28, 1939 |
| 2,816,879 | Wittbecker | Dec. 17, 1957 |

FOREIGN PATENTS

| | | |
|---|---|---|
| 530,267 | Great Britain | Dec. 9, 1940 |
| 51,510 | Netherlands | Nov. 15, 1941 |